United States Patent [19]
Welsch et al.

[11] Patent Number: 6,145,289
[45] Date of Patent: Nov. 14, 2000

[54] WINDROW GROUPER ARRANGEMENT

[75] Inventors: Thomas Welsch, Gersheim, Germany; Pascal Georgel, Rahling, France

[73] Assignee: Deere & Company, Moline, Ill.

[21] Appl. No.: 09/243,350

[22] Filed: Feb. 1, 1999

[30] Foreign Application Priority Data

Feb. 4, 1998 [DE] Germany .......................... 198 04 250

[51] Int. Cl.[7] ................................................. A01D 57/30
[52] U.S. Cl. ............................................. 56/192; 56/13.6
[58] Field of Search ................................ 56/6, 13.6, 192, 56/228, 218, 281, 11.2, 181, 182, 189, DIG. 2, DIG. 21

[56] References Cited

U.S. PATENT DOCUMENTS

| | | | |
|---|---|---|---|
| 3,664,101 | 5/1972 | Hurlburt | 56/12.4 |
| 3,721,080 | 3/1973 | Marsh | 56/192 X |
| 4,392,339 | 7/1983 | Berlivet et al. | |
| 4,590,751 | 5/1986 | Stephenson | 56/192 |
| 5,031,393 | 7/1991 | Rostoucher | |
| 5,351,468 | 10/1994 | Pominville | 56/192 |
| 5,930,988 | 8/1999 | Hanson | 56/192 X |

FOREIGN PATENT DOCUMENTS

| | | | |
|---|---|---|---|
| 0 165 602 | 12/1985 | European Pat. Off. | A01D 57/30 |
| 0 439 991 | 8/1991 | European Pat. Off. | A01D 57/20 |
| 0 779 020 | 12/1996 | European Pat. Off. | A01D 57/20 |
| 2483736 | 12/1981 | France | A01D 57/20 |
| 196 45 629 A1 | 5/1998 | Germany . | |

*Primary Examiner*—Robert E. Pezzuto

[57] ABSTRACT

A mower for harvesting crop includes windrow forming housing where crop is discharged after being cut. A windrow grouper attachment includes a crop conveyor attached to the main frame of the mower by a vertically swingable support which is selectively disposable in a lowered working position where it intercepts crop exiting the windrow forming housing and transfers it side ways and in a raised non-use position wherein it permits crop exiting from the mower to be deposited into a windrow directly behind the mower. The vertically swingable support for the crop conveyor is mounted to a slide that is in turn mounted for shifting laterally on a transverse beam of the mower main frame. By selectively manipulating the conveyor among its working, non-use and shifted positions, it is possible to deposit three windrows alongside each other for being subsequently picked up together for processing by another machine, such as an ensilage harvester, for example.

5 Claims, 3 Drawing Sheets

WINDROW GROUPER ARRANGEMENT

BACKGROUND OF THE INVENTION

The invention concerns a windrow grouper arrangement for use together with a mowing implement that normally forms a single windrow of crop, the grouper including a conveyor arrangement which transports crop to be windrowed to one side and which can be brought into an operating position that accepts crop and a non-operating position that does not accept crop exiting from the windrow forming discharge housing of the mower.

EP-A1-0 439 991 discloses a windrow grouper arrangement that is attached to a mowing implement and takes up crop harvested by the implement and deposits it to the side or that can be brought into a non-operating position, in which the mowed crop falls to the ground. The grouper arrangement includes a conveyor arrangement consisting of several rolls arranged parallel to each other, which rotate in the same direction and thereby convey the mowed crop to the side. The rotational speed of the rolls can be varied in order to change the distance of ejection.

EP-A1-0 165 602 reveals a windrow grouper arrangement including a conveyor belt as a conveying device. When necessary, this grouper can be attached to the mowing implement and is then connected to it in a fixed position. The conveyor belt can be shifted to the side within the conveying device in order to deliver the crop at various distances or at a different side.

According to EP-A1-0 779 020, a windrow grouper arrangement includes a conveyor arrangement supported on a mowing implement by means of parallel arms so that it can be moved to the side, and hence can occupy various sideways positions with respect to the mowing implement, so that the windrow to be generated can be deposited at various transverse locations relative to the mowing implement. In order to assure that the crop is not scattered when it reaches the ground, a shield is provided against which the crop is thrown so that a more or less exact side edge of the swath results.

The problem underlying the invention is seen in the fact that the known arrangements for depositing crop windrows alongside each other are capable only of forming a double windrow and crop processing machines such as forage harvesters have the capacity to process more crop than is deposited in two windrows.

SUMMARY OF THE INVENTION

According to the present invention, there is provided an improved windrow grouping arrangement.

A broad object of the invention is to provide a windrow grouping arrangement capable of depositing three swaths or windrows together.

A more specific object of the invention is to provide in combination with a mower having the capability of forming one windrow, a grouper attachment having modes of operation capable of placing two other windrows in side-by-side relationship to the one formed by the mower, thereby leaving a total of three windrows for subsequent processing by another crop processing implement such as a forage harvester. This object is accomplished by providing a grouper attachment in the form of a conveyor mounted to a transverse beam of the main frame of the mower by a combined slide and support structure which permits the conveyor to be shifted sideways along the frame as well as moved between a lowered operative position, wherein it intercepts crop discharged from the windrow forming housing at the rear of the mower, and a raised position permitting the crop exiting the mower to be formed into a windrow directly behind the mower.

These and other objects of the invention will become apparent from a reading of the ensuing description together with the appended drawings.

DESCRIPTION OF THE PREFERRED EMBODIMENT

Figure 1:
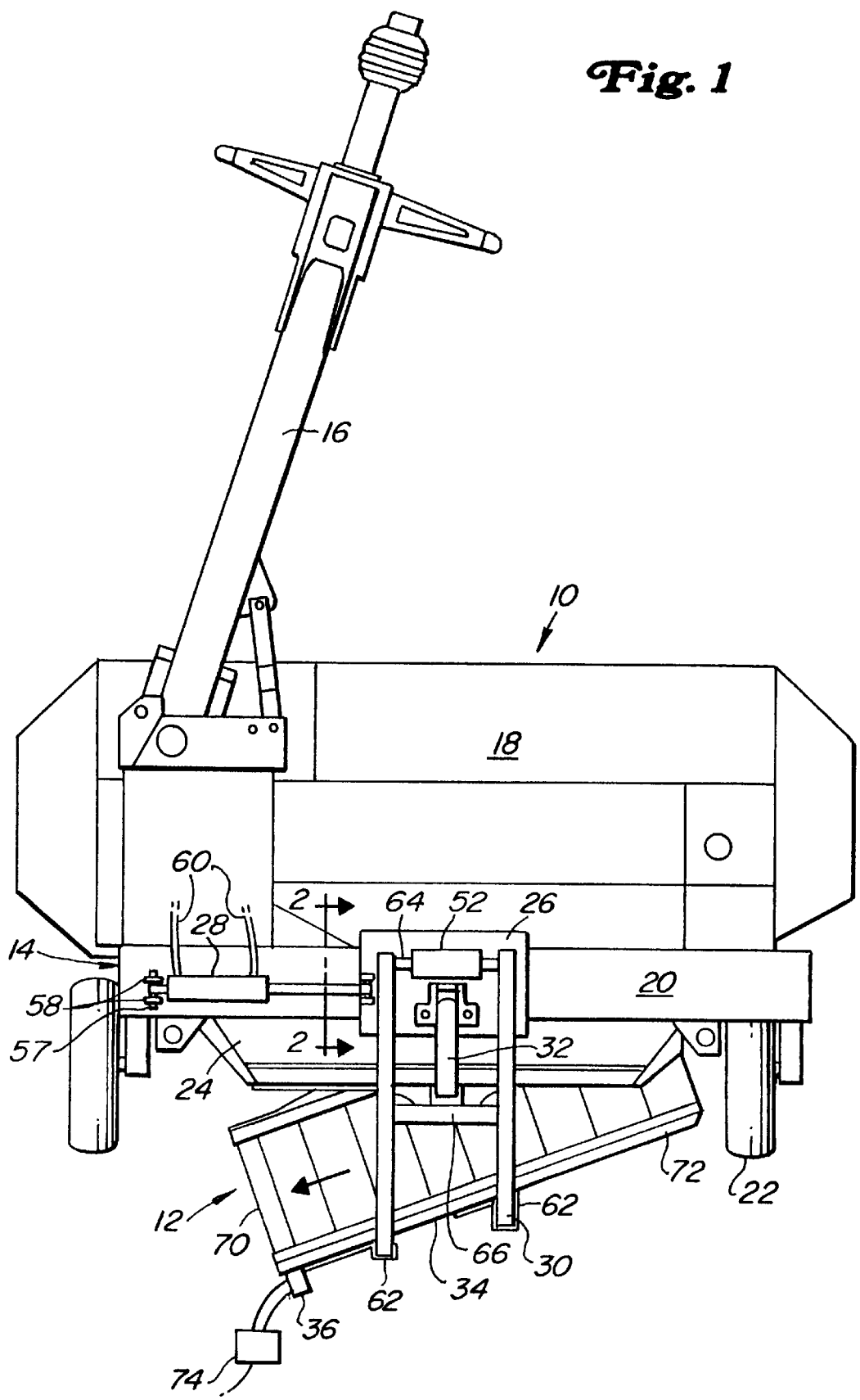
FIG. 1 shows a plan view of a harvesting machine together with a windrow grouper attachment constructed in accordance with the present invention.

A harvesting machine 10 shown in FIG. 1 is configured as a mower and carries at its rear end a windrow grouper attachment 12 constructed according to the present invention.

Figure 3:
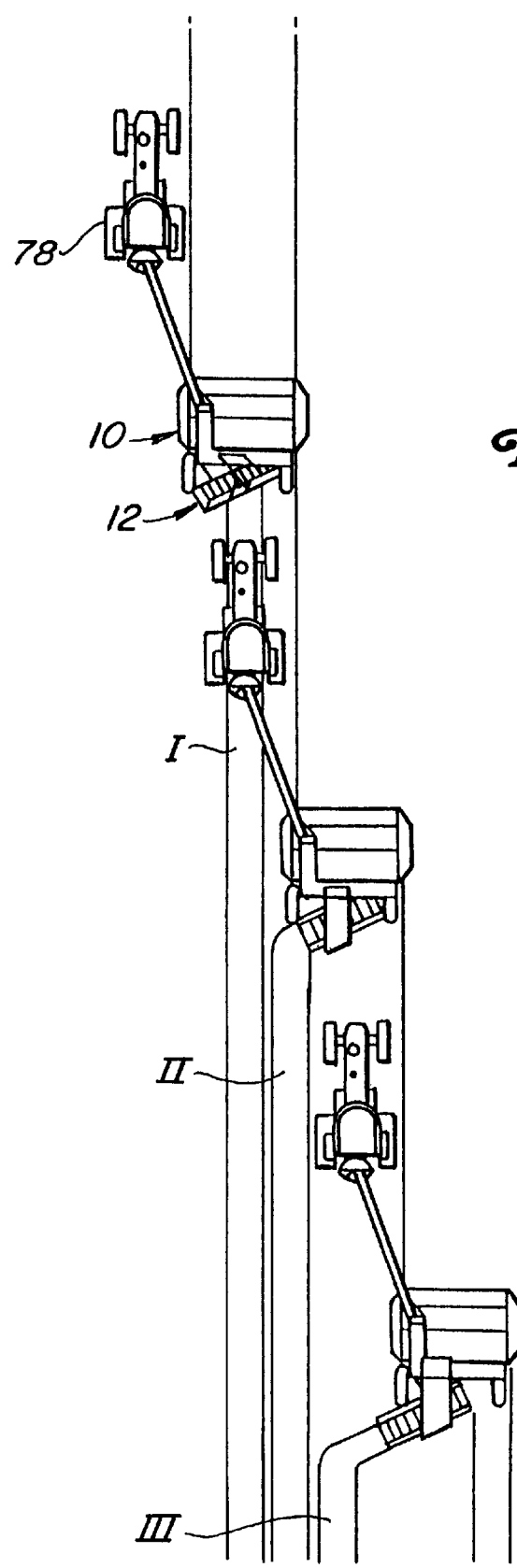
FIG. 3 shows three operating conditions that can be attained with mower and grouper attachment combination during field operation so as to result in the formation of three side-by-side windows.

The harvesting machine 10 includes a frame 14, a draft tongue 16 and a harvesting unit or header 18, that are combined into a towed unit. The frame 14 includes a beam 20, that extends transverse to the direction of travel of the harvesting machine 10 and is positioned above a rear portion of the header 18. Depending from opposite ends of the beam 20 are wheel support legs respectively to which ground wheels 22 are connected. The draft tongue 16 extends generally in the direction of travel, has its rear end coupled to the frame 14 for pivoting horizontally about an upright axis, and can be coupled at its forward end to an agricultural tractor 78 (FIG. 3).

The harvesting unit or header 18 includes a cutter bar, not shown, or another type of mowing device and may also contain, if desired, a crushing or conditioning unit, also not shown, located between the mowing device and the grouper attachment 12. At the rear end region of the header 18 that extends under the beam 20, a discharge housing 24 is provided, whose discharge opening is considerably narrower than the cutting width of the mowing device. In the non-operating condition of the grouper attachment 12, the width of the discharge opening corresponds essentially to the width of the windrow that is formed. Thus, the header 18 is able to sever crop over a great width from the ground and to deposit it in a narrow windrow on the ground.

In the embodiment shown, the windrow grouper attachment 12 includes a slide 26, a first servomotor or hydraulic actuator 28, a support arrangement 30, a second servomotor or hydraulic actuator 32 and a conveyor arrangement 34 having a drive motor 36, which is preferably a hydraulic motor.

Figure 2:
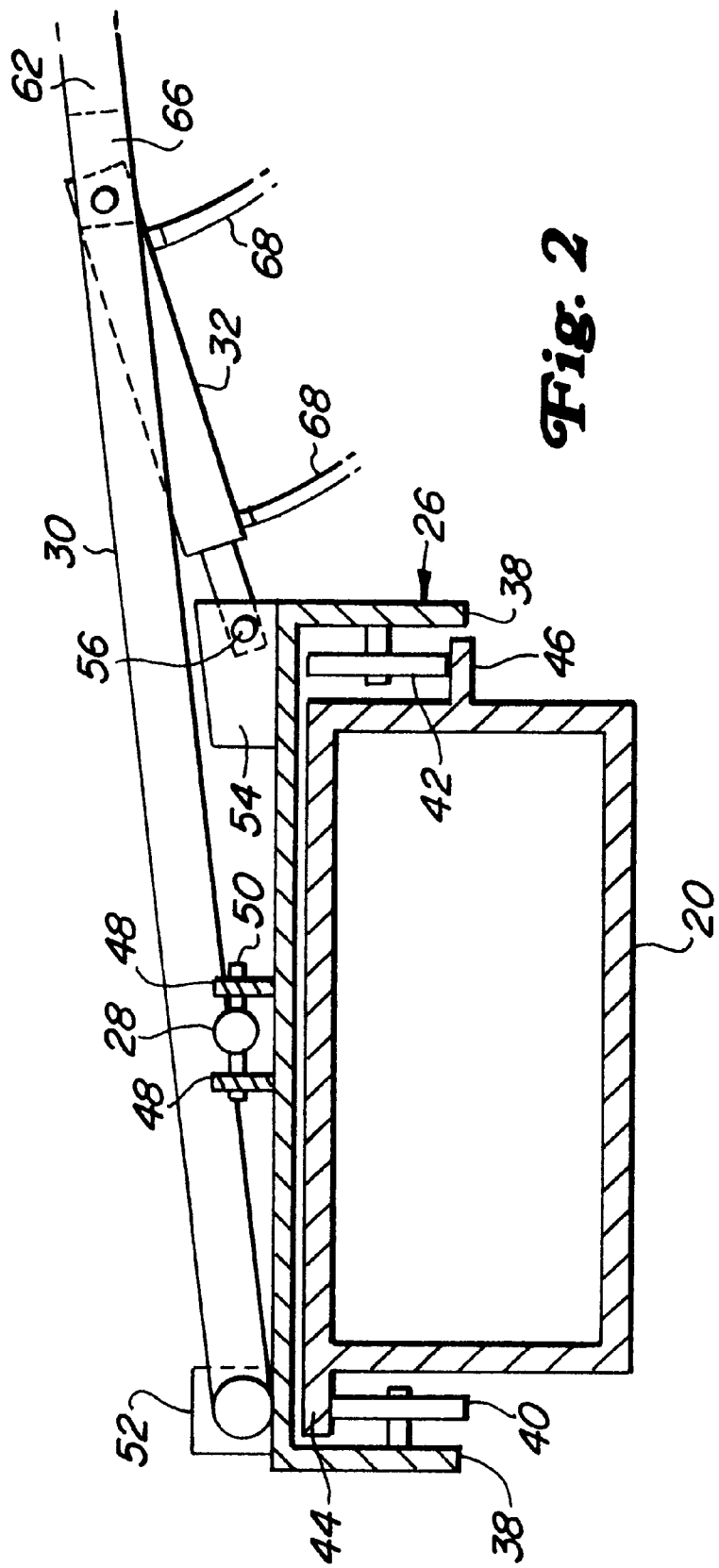
FIG. 2 shows a vertical section taken along line 2—2 of FIG. 1.

Referring now also to FIG. 2, it can be seen that the slide 26 is configured in the form of an inverted "U" and engages with its interior the beam 20 over a large portion of its cross section. On inner sides of opposite vertical legs 38 of the slide 26 is provided horizontal axles that support front and rear rollers 40 and 42, respectively. The front roller 40 is supported on an undersurface of a horizontal rail 44 provided at the upper front corner of the beam 20 and extending close to the adjacent leg 38 of the slide 26. Slide rails or the like including low friction slideway coatings, that are not shown, may be provided between the end surface of the rail 44 and the inner surface of the leg 38, for the purpose of reducing friction forces in the case of a possible contact between the surfaces.

The rear roller 42 is supported on an upper surface of a rail 46, that is joined to, and extends horizontally at approximately mid-height from, a rear side of the beam 20. This rail 46 has its outer edge located nearly to an inner surface of the rear leg 38 of the slide 26. Again, slide rails with low friction slideway coatings, not shown, may be provided between the end surface of the rail 46 and the rear leg 38 of the slide 26 so as to reduce friction forces in the case of possible contact. Points of contact respectively above and below the rollers 40 and 42 on the rails 44 and 46 is effected by the attachment and configuration of the support arrangement 30, which has the effect of tipping the slide 26 about the longitudinal axis of the beam 20 in the clockwise direction, as seen in FIG. 2. Other methods of support of the slide 26 on the beam 20 are possible, for example, with the use of slideway rails, ball bearings or the like. However, in any method of support, it is necessary to observe that the length of the bearing surface is so dimensioned in proportion to the width of the beam 20 that tilting cannot occur. The rails 44 and 46 may be configured as a one-piece unit with the beam 20 or they be subsequently attached to the latter, for example, by bolting or welding. During operation, the inner surfaces of the legs 38 and top of the slide 26 are spaced from the ribs 44 and 46 and the top of the beam 20, however, frictional contact between the adjacent surfaces of the slide with the beam and ribs may occur when the machine 10 is traversing irregularities on the ground.

Two vertical lugs 48 are attached to, and located at approximately at half the width of a top surface of, the slide 26. The lugs 48 are spaced from each other in the direction of travel and a pin 50 extends horizontally through the lugs 48 and serves to couple the rod end of the hydraulic actuator 28 to the slide 26. Fixed to an upper surface location of the slide 26 that is above the front roller 40 is a bearing 52, the purpose of which is explained below. Above the rear roller 42, two vertical lugs 54 are provided that are spaced transversely from each other and through which a pin 56 extends and couples the rod end of the hydraulic actuator 32 to the slide 26.

The first servomotor or hydraulic actuator 28 is configured as a double-acting hydraulic cylinder which, as stated above, has its rod end retained to the slide 26 by the pin 50 and has its cylinder end coupled by a pin 57 received in a pair of fore-and-aft spaced lugs 58 fixed to a top, left location on the beam 20. For its actuation, the servomotor 28 is connected through hydraulic lines 60 with a control or regulating arrangement, not shown, preferably located on the towing vehicle. As can be seen, in particular in FIG. 1, the slide 26 and with it the conveyor arrangement 34 can be moved by the first servomotor 28 along the beam 20.

The support arrangement 30 includes a pair of transversely spaced, parallel arms 62 having their forward ends coupled by a shaft 64 and being fixed together at a location intermediate their front and rear ends by a cross member 66. The shaft 64 is journalled in the bearing 52, thereby establishing a horizontal, transverse axis about which the support arrangement 30 may pivot. The arms extend rearwardly beyond and then downwardly at a back side of the conveyor arrangement 34 where they are fixed, it being noted that the arms 62 differ in their lengths and hence engage the conveyor arrangement 34 in such a way that the arrangement 34 is angled from front to rear to the direction of travel towards the left-hand side of the machine 10, this side being that to which the draft tongue 16 is attached. The conveyor arrangement 34 thus ends on the opposite side of the machine 10 from the tongue 16 alongside the left-hand wheel 22. The second servomotor 32 is provided for swinging the support arrangement 30 vertically and for that purpose has its cylinder end pivotally attached to the cross member 66, it already being noted that its rod end is coupled to the slide 26. By means of the servomotor 32, the support arrangement 30 can be pivoted vertically and thereby the conveyor arrangement 34 can be pivoted from an operating position (see FIGS. 1 and 2) underneath the discharge housing 24 to a non-operating position above or to the rear of the discharge housing 24, this latter mode of operation being depicted at the top of FIG. 3. Like the servomotor 28, the supply of fluid to and drainage of fluid from the servomotor 32 can be controlled by a control or regulating arrangement located on the towing vehicle and coupled to the actuator 32 by hydraulic lines 68. Depending on the pivot angle selected, a single-acting hydraulic actuator may be used instead of the double-acting actuator 32.

The conveyor arrangement 34 as disclosed herein includes a conveyor belt 70 that is provided with conveyor ribs extending transverse to the direction of circulation of the belt indicated by the arrow in FIG. 1. The conveyor belt 70 is supported from a frame 72 by rolls (not shown) mounted in bearings so that the belt 70 can circulate by means of the rolls, and is therefore able to convey crop accepted from the discharge housing to the left, as seen in FIG. 1. The drive motor 36 for the conveyor belt 70 is applied to one of the rolls and is here shown as a hydraulic motor, that is supplied through hydraulic lines 74 which are again supplied by the control or regulating arrangement located on the towing vehicle. At least one of the hydraulic lines 74 may be provided with a flow modification device 76, for example, in the form of a valve, an orifice, a throttling restriction or the like, by means of which the rotational speed of the motor 36 can be varied.

On the basis of the description up to this point and as seen in FIG. 3, the operation of the grouper attachment 12 according to the invention in combination with the harvesting machine 10 shall be explained in the following.

FIG. 3 shows the harvesting machine 10 with the grouper attachment 12 towed by a towing vehicle 78 in three different operating modes which are described in sequence from top to bottom.

In the situation pictured at the top, the conveyor arrangement 34 of the grouper attachment 12 is raised so that the crop that has been mowed exits the discharge housing 24 and falls to the ground between the wheels 22 of the harvesting machine 10 and remains deposited there in a first windrow I.

In the operating mode depicted below this, the conveyor arrangement 34 is lowered and intercepts crop coming from the discharge housing 24 in order to deposit it in a second windrow II essentially behind the left wheel 22. During this process, the towing vehicle 78 travels in such a way that its wheels straddle the windrow I. The windrows I and II are thus deposited to lie immediately alongside each other.

In the operating mode shown at the bottom of the view, the towing vehicle 78 travels across the field that has been mowed and does not straddle windrow II. The conveyor arrangement 34 of the grouper attachment 12 remains in its lower position, but is shifted to the left by effecting contraction of the actuator 28 from its extended position shown in FIG. 1. In this way, a windrow III is formed, not behind the left wheel 22, but to the left of it. It can be seen that this third windrow III lies close alongside the windrow II. In addition to shifting the conveyor arrangement 34 to the left, it is possible to operate the drive motor 36 at a higher speed, so that the crop is deposited sufficiently far to the left of the harvesting machine 10. Preferably, the windrows I–III are together narrower than 4 meters and can be taken up by a single pick-up of a machine, for example a forage harvester, for further processing of the crop.

What is claimed is:

1. In a combination of a mower for severing crop and a windrow grouper attachment cooperating with the mower for placing windrows of crop adjacent each other, wherein said mower includes a mobile main frame having a transverse upper beam to one end of which is coupled a forwardly extending draft tongue and a header coupled to the main frame and including a rear crop discharge housing located beneath said transverse beam for depositing a windrow of crop centrally behind the mower, and said grouper attachment including a conveyor mounted to said transverse upper beam for movement between a lowered operative position, wherein it intercepts crop exiting said discharge housing before the crop falls to the ground, and a raised non-use position wherein it permits crop exiting said discharge housing to fall to the ground, the improvement comprising: said grouper attachment further including a slide structure mounted to said transverse beam for shifting sideways relative to said beam; and a powered actuator coupled between said main frame and slide structure for selectively shifting the latter from an inner first position to an outer second position; and said conveyor being mounted to said slide structure for shifting movement together with said slide structure and for vertical movement relative to said slide structure, whereby the combined mower and grouper attachment may be operated to place three windrows in side-by-side relationship to one another for subsequently being picked up by a pick-up of a crop processing machine.

2. The combined mower and windrow grouper as defined in claim 1 wherein said slide structure is mounted for movement along said beam.

3. The combined mower and windrow grouper as defined in claim 1 wherein said beam has front and rear sides; a first horizontal rail being fixed to said front side of said beam and a second horizontal rail being fixed to said rear side of said beam at a height below that of said first rail; said slide structure being shaped like a "U" in cross section and having front and rear vertical legs respectively disposed adjacent front and rear edges respectively of said first and second rails; a front spindle being mounted to said front leg at a location below said first rail; a first roller being mounted on said front spindle and engaged with said front rail; a rear spindle being mounted to said rear leg and extending above said rear rail; a second roller being mounted on said rear spindle and engaged with said rear rail; a support structure for said conveyor being pivotally mounted to an upper front location of said slide structure for swinging about a horizontal axis extending parallel to a longitudinal axis of said beam; a second powered actuator being connected between an upper rear location of said slide structure and said support structure for pivoting the support structure vertically about said horizontal axis; and said conveyor assembly extending beneath and being fixed to said support structure whereby the weight of said conveyor acts on said slide structure in a direction tending pull the front side up and force the rear side down so as to respectively keep the first roller in contact with said front rail and the second roller in contact with said rear rail.

4. The combined mower and windrow grouper as defined in claim 1 wherein said conveyor is a belt conveyor having its length dimension angled rearwardly from front to rear relative to said beam for delivering crop along a path passing behind a left wheel of said mower; and said conveyor, when in its lowered operative position with said slide structure located in its inner position, being positioned for depositing a windrow of crop along a path in line with said left wheel, and when in its lowered operative position with said slide structure located in its outer position being positioned for depositing a windrow of crop at an outer side of said left wheel.

5. The combined mower and windrow grouper as defined in claim 3 wherein said conveyor is a belt conveyor having its length dimension angled rearwardly from front to rear relative to said beam for delivering crop along a path passing behind a left wheel of said mower; and said conveyor, when in its lowered operative position with said slide structure located in its inner position, being positioned for depositing a windrow of crop along a path in line with said left wheel, and when in its lowered operative position with said slide structure located in its outer position being positioned for depositing a windrow of crop at an outer side of said left wheel.

\* \* \* \* \*